United States Patent [19]

Wise et al.

[11] Patent Number: 5,477,472

[45] Date of Patent: Dec. 19, 1995

[54] DUAL HYSTERESIS METHOD OF GENERATING SQUARE WAVES FROM NON-UNIFORM CYCLICAL SIGNALS

[75] Inventors: William D. Wise, Flora; Marc L. De Wever; Dale J. Kumke, both of Kokomo; Everett R. Lumpkin, Galveston; Matthew D. Sale; Brian W. Schousek, both of Kokomo, all of Ind.

[73] Assignee: Delco Electronics Corp., Kokomo, Ind.

[21] Appl. No.: 355,749

[22] Filed: Dec. 14, 1994

Related U.S. Application Data

[62] Division of Ser. No. 203,097, Feb. 28, 1994.

[51] Int. Cl.$^6$ .................................................... B60T 8/12
[52] U.S. Cl. ................. 364/574; 364/577; 324/76.12; 324/76.39
[58] Field of Search ............ 307/10.1; 324/76.12–76.39, 324/160, 161, 163, 166, 503, 522; 364/424.01, 426.01, 426.02, 556, 570, 574, 577

[56] References Cited

U.S. PATENT DOCUMENTS

| | | | |
|---|---|---|---|
| 3,856,365 | 12/1974 | Steigerwald et al. | 340/53 |
| 4,042,788 | 8/1977 | Richards | 324/78 |
| 4,125,295 | 11/1978 | Ruhnau et al. | 303/95 |
| 4,270,176 | 5/1981 | Skarvada | 364/565 |
| 4,286,176 | 8/1981 | Jarrett et al. | 307/261 |
| 4,534,041 | 8/1985 | Münter | 364/724 |
| 4,626,763 | 12/1986 | Edwards | 318/811 |
| 4,700,304 | 10/1987 | Byrne et al. | 364/426 |
| 4,914,387 | 4/1990 | Santos | 324/166 |

*Primary Examiner*—Emanuel T. Voeltz
*Assistant Examiner*—Craig Steven Miller
*Attorney, Agent, or Firm*—Mark A. Navarre

[57] ABSTRACT

A system for anti-lock brake and traction control has a control circuit comprising a microprocessor on a silicon die. Inputs from several variable reluctance wheel speed sensors are multiplexed to a single channel on the same die for signal processing including diagnostics, A/D conversion, square wave generation for each sensor by a state machine, and wheel speed determination from the square waves. The state machine algorithm tracks signal peaks and valleys and uses a dual hysteresis method of generating output transitions to capture all cycles of a signal having single cycle anomalies while rejecting noise. A single rear wheel sensor having twice the frequency of front wheel sensors for equal wheel speeds is processed twice as often as each front sensor. The diagnostics include detecting sensor and harness short and open circuits by comparison of signals to programmable thresholds and fault timing and latching by gauging open and short signals against programmable time limits. Common mode noise rejection is accomplished by detecting common mode aberration and disabling an A/D converter during the aberrations. Other diagnostics include inputting known artificial signals at sensor inputs or wheel speed circuit inputs and checking for expected outputs, or by calculating wheel speed in parallel paths having the same square wave inputs and using different algorithms.

7 Claims, 4 Drawing Sheets

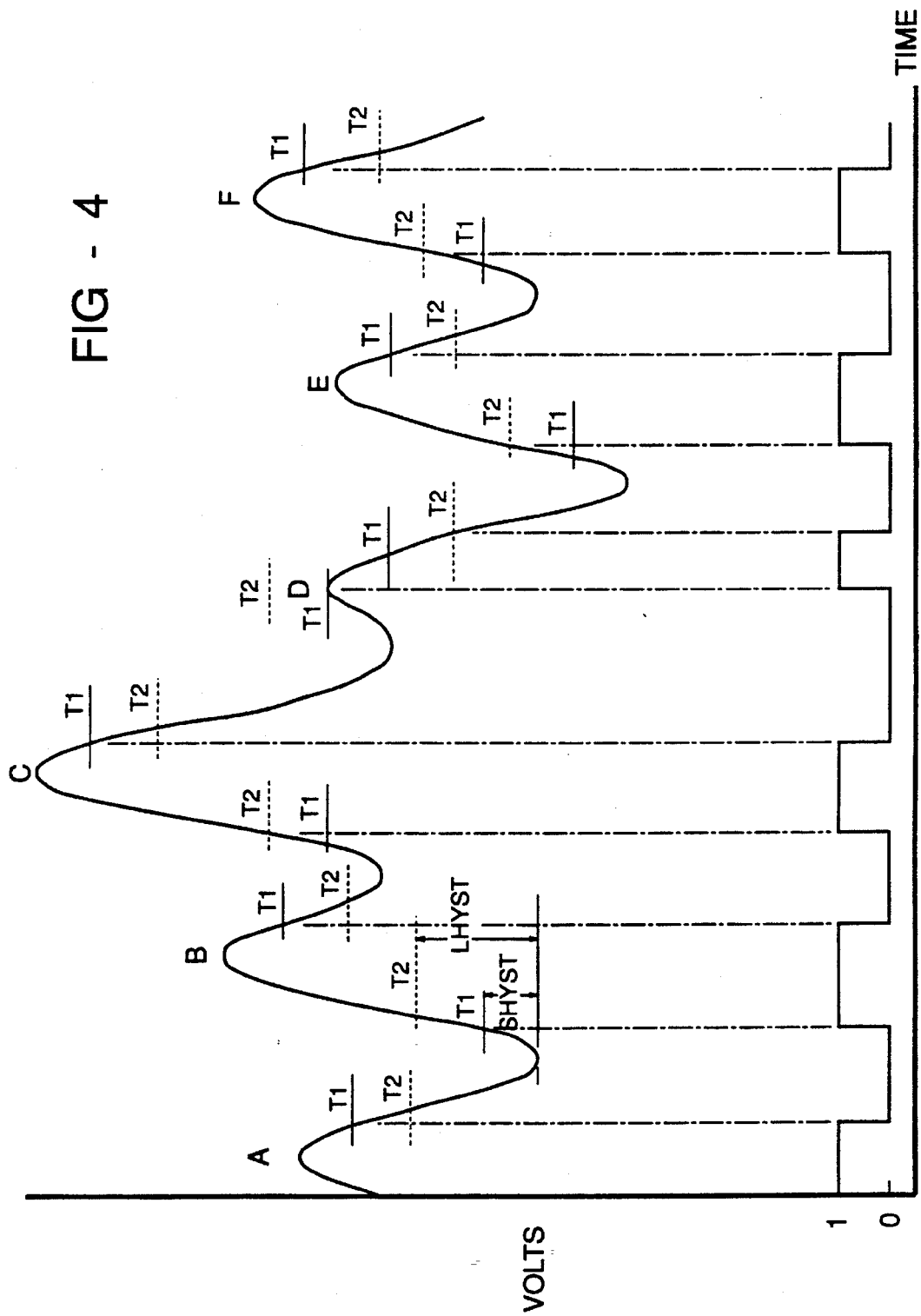

5,477,472

DUAL HYSTERESIS METHOD OF GENERATING SQUARE WAVES FROM NON-UNIFORM CYCLICAL SIGNALS

This is a division of application Ser. No. 08/203,097, filed on Feb. 28, 1994, now pending.

FIELD OF THE INVENTION

This invention relates to generating square waves and particularly to a method using two different hysteresis levels to accommodate nonuniformity in signal amplitudes.

BACKGROUND OF THE INVENTION

It is known in automotive vehicle control systems to utilize wheel speed information which is processed in a computer for operating a control such as antilock brakes or traction control. Frequently the wheel speed of all four wheels or of both front wheels and the average of the rear wheels are used for control purposes. In such cases three or four variable reluctance wheel speed sensors are fed to the computer control, each sensor having a separate channel for processing the wheel speed. The processing may include sensor and channel diagnostics, amplification, square wave generation, A/D conversion, and determination of each wheel speed. At some point in the process the signals are digitized and fed to the computer.

To the extent that the channels are separate, it is relatively easy for the computer to diagnose faulty operation in a sensor or channel: when the wheel speeds are expected to be equal, the channel outputs are compared and any deviant channel has an output different from the others. Verifying the processing occurring within the computer is more difficult. It has been proposed to use two microprocessors running in parallel so that one can be a check for the other. However, such large scale redundancy is expensive in terms of the amount of space required on a computer die.

To upgrade antilock brakes and traction control systems, it is here proposed to include on the computer die functions which previously have been accomplished separately. Yet because of the need to conserve space on the silicon die, the processing must be done efficiently and in some cases with less circuitry than used in more conventional systems. One feature is to multiplex the incoming sensor signals and process the signals through only one channel instead of three or four. This presents some challenges, for example, diagnostics of the external sensors, harnesses and processing channel no longer can rely on comparing one channel to another. New diagnostics, then, are needed not only for external circuits but for internal operations. An advantage to incorporating the input functions on the same die as the computer is that the computer is readily available for assisting with some of the processing or the diagnostics, affording some amenities not previously practical.

To afford digital wheel speed information to the control it is desirable to first form digital square waves, corresponding in frequency to each analog input signal, from which wheel speed can be calculated. Thus means for simply and reliably forming the several square waves using a minimum of die space is needed. Due to sensor runout and sometimes a damaged sensor tooth, the analog input signal is not a uniform sine wave, and special measures are needed to correctly convert to a square wave.

An anti-lock brake system for a front wheel drive vehicle usually has a separate sensor on each of the four wheels. In that case four square waves of similar characteristics are generated. However rear wheel drive vehicles may have separate sensors for front wheels and a single sensor for the rear wheels, perhaps driven by the drive shaft, and the rear sensor frequency is approximately twice that of the front sensors for the same wheel speeds. It is desired, therefore, to accommodate both kinds of systems with the same controller, but with a simple software switch for adapting to three sensor or four sensor configurations.

SUMMARY OF THE INVENTION

It is therefore an object of the invention to provide a method of generating square waves from nonuniform analog inputs. Another object is to generate square waves for systems having either three or four wheel speed sensors with different operation frequencies.

The system which embodies the invention includes a particular way of biasing the variable reluctance wheel speed sensors so that shorts and opens in the sensors and harnesses can be diagnosed. A multiplex circuit is used to direct the outputs of each sensor, in turn, to an input instrumentation amplifier which is used to not only output a signal representing the differential sensor voltage but a common mode signal as well. The common mode signal ideally is constant but sensor shorts and input transients can cause abnormal variations. A window comparator with thresholds bracketing the normal common mode voltage is used to detect such variations. High and low sensor lead voltages must vary over a given range due to wheel movement or open circuit conditions. Open circuit conditions are detected by comparators set at certain thresholds. In each case when thresholds are exceeded, the comparator outputs are timed and a fault is indicated when a comparator time due to a short or an open exceeds a time limit. All of these thresholds and time limits are programmable to optimize the system for a particular application or for special diagnostics at the time of factory testing or servicing.

The output signal of the amplifier is digitized by an analog to digital converter. The signal from the window comparator is fed forward to the converter to block conversion when the comparator has an output indicative of an aberrant common mode voltage due to either a short or a transient. The A/D converter output remains the same as long as the aberrant voltage is present to avoid passing on the transients. The A/D output stores the current digital values for the several sensors in separate registers.

A state machine is used to analyze the digital values and convert the nominal sine wave input to square waves. Since the inputs may vary greatly from ideal sine waves due to sensor runout or damaged sensor gear teeth, the irregular wave shapes are identified according to peaks and valleys, rather than zero crossings. Peaks and valleys are detected and a square wave edge is identified when the signal passes below a beak (or above a valley) by a hysteresis value. A dual hysteresis method is used to circumvent single cycle anomalies caused by a damaged tooth. Timing circuitry registers the time of occurrence of each edge and counts the number of edges which occur so that the control algorithm can compute wheel speed. The A/D converter and the state machine can be software selected to accept signals from a rear sensor operating at twice the frequency of the front sensors and to sample the rear sensor voltage twice as often to maintain the same sample rate per cycle for all the sensors.

BRIEF DESCRIPTION OF THE DRAWINGS

The above and other advantages of the invention will become more apparent from the following description taken in conjunction with the accompanying drawings wherein like references refer to like parts and wherein:

FIG. 4 is a waveform diagram illustrating a typical sensor signal and a resulting square wave signal as determined by the method of the invention;

DESCRIPTION OF THE INVENTION

Figure 1:
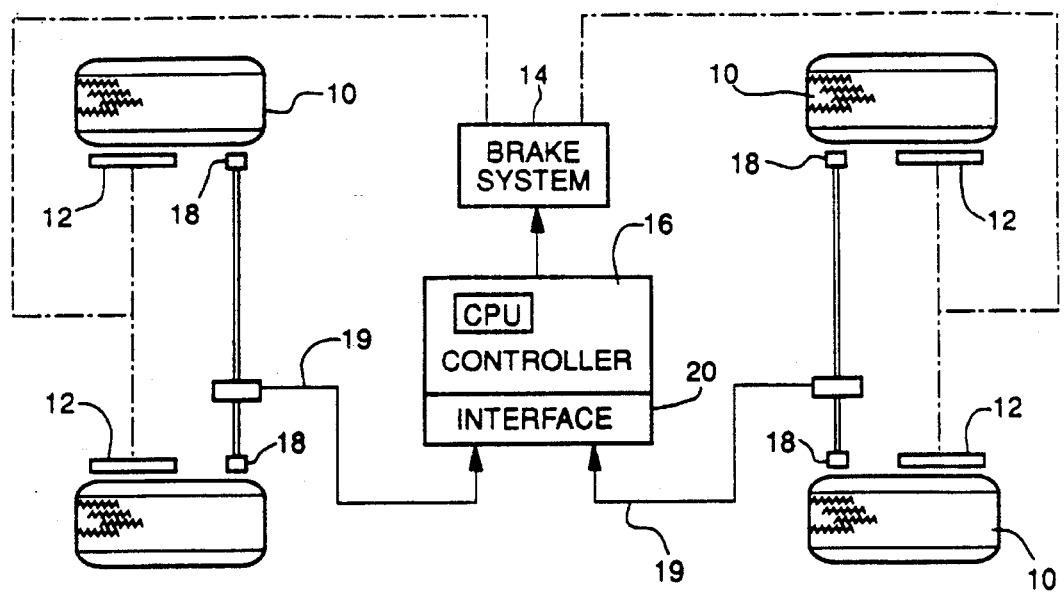
FIG. 1 is a block diagram of an antilock brake system according to the invention.

FIG. 1 diagrams an overview of an antilock brake system and/or traction control system. Each operates by sensing wheel speed and judiciously applying or releasing brake pressure to attain desired braking performance or traction. Vehicle wheels 10 each have a brake 12 controllably coupled to a brake system 14, which in turn is operated by an electronic controller 16. The controller, including a microprocessor based computer or CPU, resides on a single die or silicon chip. Wheel speed information is provided by conventional gear tooth type variable reluctance sensors 18 which are coupled to the controller 16 through a harness 19 and an interface 20. The harness 19 comprises a high lead and a low lead for each sensor 18 for supplying inputs to the controller.

Figure 2:
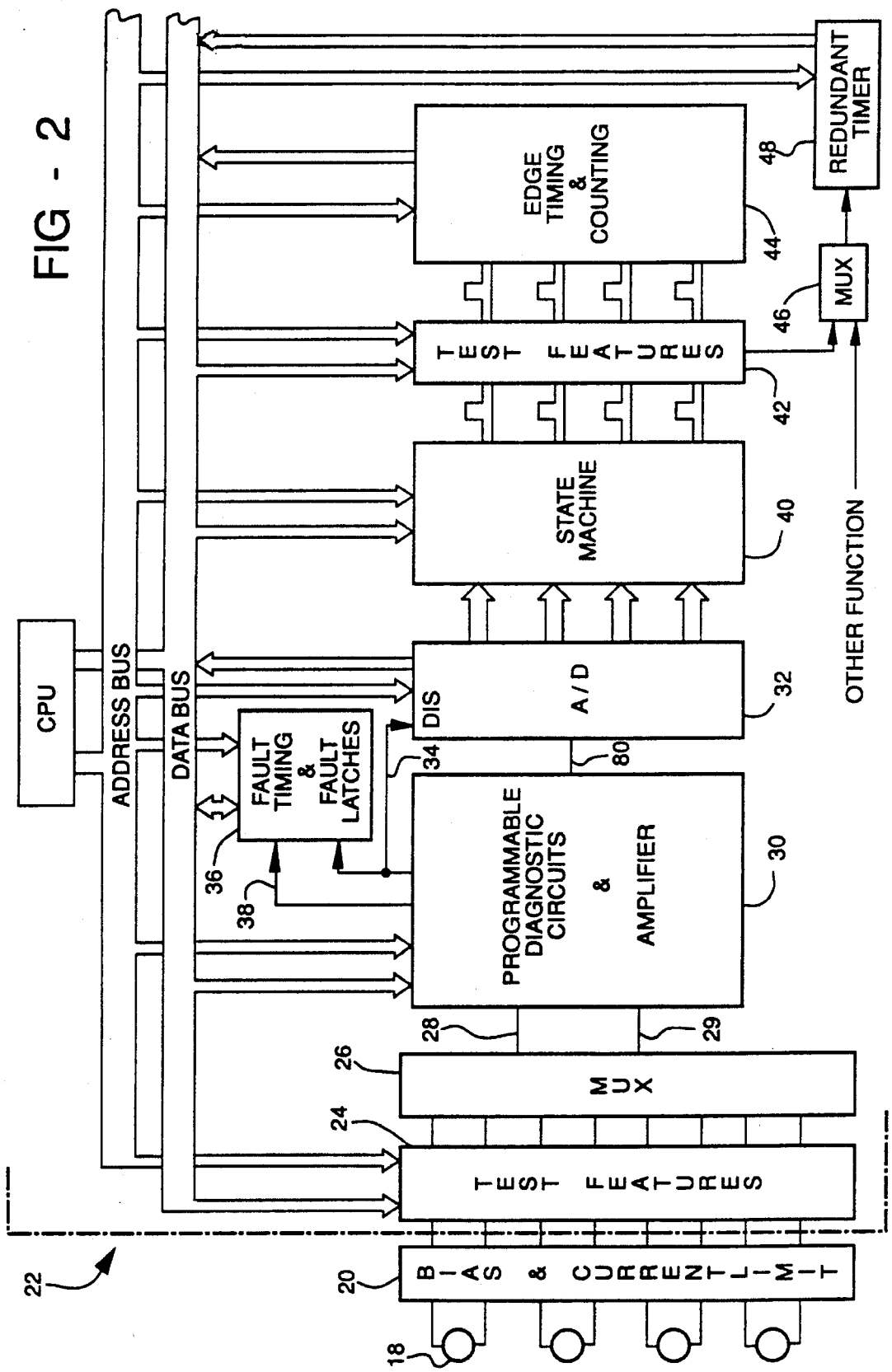
FIG. 2 is a system diagram of the control according to the invention with speed-sensor inputs.

In FIG. 2 the interface 20 is labelled as Bias and Current Limit. The variable reluctance sensors 18 and the interface are external of the CPU die. A broken line 22 represents the edge of the die and everything to the right of the broken line is on the die and is coupled to the CPU by an address bus and a data bus.

As further explained below, the interface 20 connects the leads of the sensors 18 to a supply voltage and to ground in a way which facilitates diagnosis of the sensor 18 and harness 19 integrity during vehicle operation. Test features block 24 on the die connects to each sensor lead and enables specific test signals to be imposed on each lead for carrying out diagnostic routines when the vehicle is being serviced. The four sets of sensor leads are multiflexed by MUX 26 to two lines 28 and 29. According to the MUX operation the voltages on the four sets of leads are sequentially applied in separate time frames to the lines 28 and 29 and fed to programmable diagnostic circuits and amplifier 30 which operates on the signals of each time frame independently of the others.

The amplifier of the circuit 30 produces an output representing the differential sensor voltages of the sensors which is fed to an analog to digital (A/D) converter 32. The same amplifier produces a common mode voltage for each sensor which is compared to thresholds by the diagnostic circuits to determine whether shorts occur in any sensor or harness, or whether noise biases the common mode voltage beyond acceptable limits. In either case a lockout line 34 suspends A/D operation to prevent transfer of the aberrant signal to the following stage. The same line triggers a fault timer and latch 36 which latches a short fault signal when a time limit expires. The voltages of each lead are also compared to other thresholds to identify an open circuit condition in the sensor or harness. An open signal on line 38 also triggers the fault timer and latch 36 which latches an open fault signal when the open signal persists for a different time period. The thresholds and the time periods are programmable.

The A/D converter 32 samples the analog output of the circuit 30 once each time frame and stores the digital equivalents in a different register for each sensor. A state machine 40 retrieves the samples from the registers and processes them according to an algorithm which converts the nominal sine wave input to digital square waves of the same frequency by a process of seeking peaks and valleys and identifying a square wave edge when the input goes below a peak or above a valley by a hysteresis value.

A programmable test features block 42 normally passes the square waves from the A/D converter 32 to a timing circuit 44 for registering the time of occurrence of each edge and counting the number of edges which have occurred, so that the control algorithm can compute wheel speed. In test mode, the test features block can select either of two methods of testing the timing circuit 44. According to one test method square waves of known frequency are fed to the timing circuit via the test features block 24 and the CPU determines whether the timing circuit correctly determines the known wheel speed. The square waves are generated by a clock independent of the clock used by the timing circuit and the CPU. In another test method the square waves from the state machine are fed to the timing circuit 44 in the usual manner and the test features block 42 also feeds the same square waves via a MUX 46 to a redundant timer 48 which uses a different algorithm to calculate wheel speed; then the CPU makes a comparison of the two calculated wheel speeds to verify the integrity of the timing circuit 44.

Figure 3:
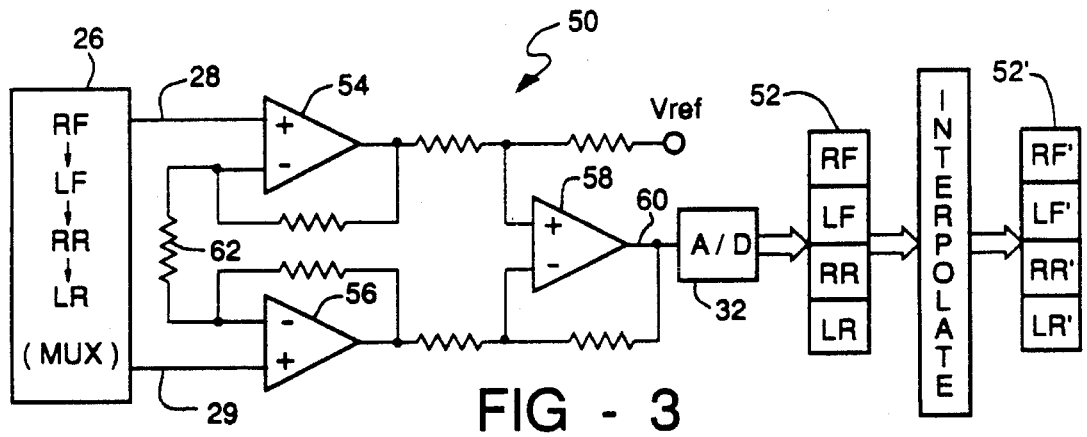
FIG. 3 is a schematic diagram of a signal amplifier showing the order of signal processing according an embodiment of the invention.

FIG. 3 shows the MUX 26 configured for a front wheel drive vehicle and which outputs the right front (RF), left front (LF), right rear (RR) and left rear (LR) sensor signals. The order of the signals is arbitrary. FIG. 3 also shows an instrumentation amplifier 50, the A/D converter 32 and an output signal which is stored in a register 52 for each of the sensors, each register being updated in turn each time the MUX 26 cycles through the four sensors. Due to practical speed limitations of A/D conversion and the small number of samples in each cycle of the signal, the digital signal is coarsely quantized. The quantization is reduced by interpolation to synthesize an additional point between each pair of converted points. The interpolation is effected by averaging the last two converted points and storing the average in another set of registers 52'.

The instrumentation amplifier 50 has two input operational amplifiers 54 and 56, each with one input connected to sensor output lead 28 or 29, and their second inputs interconnected through a gain resistor 62. A third operational amplifier 58 has its inputs coupled to the outputs of amplifiers 54 and 56 and to a positive bias voltage Vref. Each of the operational amplifiers has a feedback resistor from its output to an input. The output 60 of the amplifier 58 comprises the alternating sensor differential voltage imposed on the voltage Vref which assures that the output will remain in a positive range.

The output 60 of amplifier 58 is shown as the waveform of FIG. 4 which varies cyclically but nonuniformly due to the sensor limitations. Sensor runout due to eccentricity of the rotating sensor gear affects the variable reluctance pickup to periodically cause the voltage peaks and valley to vary. Thus the peaks, denoted A, B . . . F in FIG. 4, vary in amplitude. In addition, a broken or short gear tooth produces a smaller voltage peak than a normal tooth as shown by peak D. Other signal artifacts, not shown, may be imposed by sensor or bearing damage or wear, or by wheel noise induced during anti-lock brake operation. The challenge of squaring the signal is to develop a square wave cycle for each cycle of the signal with enough sensitivity to include the weak peaks due to a short tooth and yet exclude noise, even though the voltage peaks and valleys may vary greatly due to various signal artifacts.

The state machine is a logic circuit embedded in the die and is dedicated to performing an algorithm for generating a square wave from the nonuniform cyclical voltage. The algorithm is predicated upon detecting peaks and valleys of the signal using dual hysteresis values. That is, when a peak is identified the signal is allowed to pass below the peak by a hysteresis amount sufficient to verify that the peak is actual and not caused by noise. The same is done for valleys. However, selecting a hysteresis large enough to reject the noise would also result in missing a weak peak or valley caused by a damaged tooth. The dual hysteresis method uses a second, smaller hysteresis which is effective to capture a weak signal, but when a weak half cycle is encountered the larger hysteresis is enforced for the next half cycle. Thus a single cycle anomaly is permitted.

Referring to FIG. 4, a first threshold or reference level T1 and a second threshold or reference level T2 follows each peak and each valley. Threshold T1 is determined by subtracting a small hysteresis value from the last peak or adding it to the last valley and threshold T2 is determined by subtracting a large hysteresis value from the last peak or adding it to the last valley. Thus as indicated at the valley following peak A, the threshold T1 is determined by the small hysteresis SHYST and the threshold T2 is determined by the large hysteresis LHYST. The hysteresis sizes are programmable and are stored in registers in the state machine. The small hysteresis value is preferably about 50% or 60% of the large hysteresis. The square wave has a value of logic 1 after a valley has been detected and verified and changes to 0 when a peak is detected and verified, the square wave transitions occurring when the appropriate threshold has been reached. As can be seen in the figure, the transitions occur, with one exception, when the signal crosses the first threshold T1. When the signal reaches peak D, however, the threshold T1 for the previous valley is reached, causing a transition, but the signal never reaches threshold T2; then a transition is not permitted at the threshold T1 following the peak D and the transition occurs at T2. It should be noted that if only the large hysteresis were utilized, the peak D would be missed.

Figure 5:
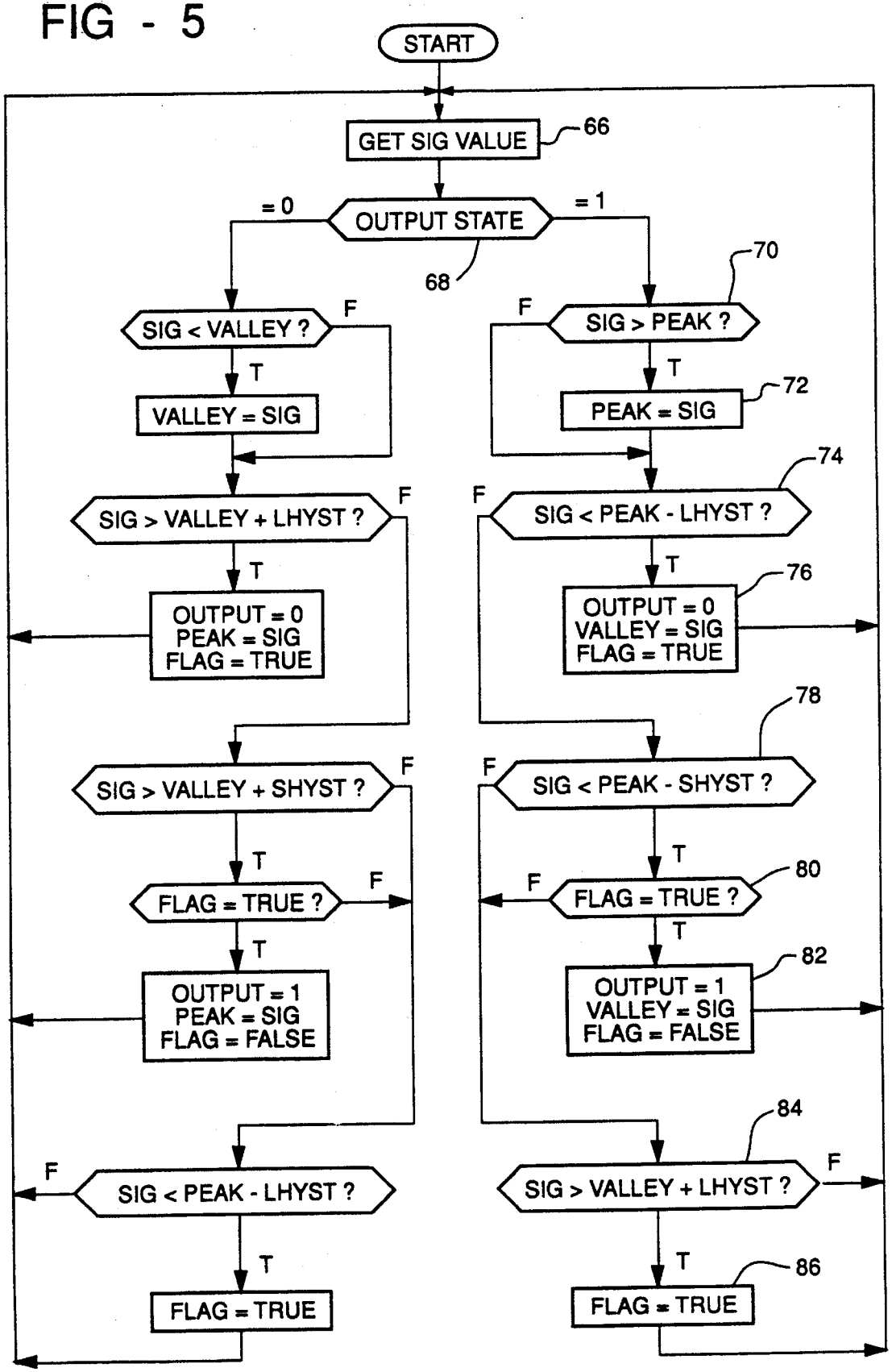
FIG. 5 is a flow chart illustrating an algorithm used by the state machine of FIG. 2 according to the invention.

The state machine algorithm is illustrated by the flow chart of FIG. 5. In this description, reference numerals in angle brackets <nn> refer to the function of the block bearing that numeral. The state machine chooses one point from the registers 52 and 52' and after that point is processed it chooses another point such that all the registers, in turn, have their contents used at the same rate that they are updated to progressively track through each signal as its digital values are converted or interpolated. For each signal, state machine registers store values for VALLEY and for PEAK, as well as a FLAG indicating whether the small hysteresis is valid for the current half cycle. Even though the state machine multiplexes all the signals, for simplicity this flow chart is configured for a case where only one signal is being processed. The overall plan of the algorithm is to find peaks and valleys by locating local maxima and minima, verifying each peak or valley and generating a square wave transition when the signal decreases from a peak or increases from a valley by at least a small hysteresis value, or by a large hysteresis value if the signal failed to surpass the previous peak or valley by the large hysteresis amount.

In FIG. 5 the state machine first gets a signal value SIG from a register <66>. If the square wave output logic 1 <68> a valley has already been verified and a peak is being sought. If the SIG is greater than the stored value of PEAK <7>, PEAK is updated to the value of SIG <72>, otherwise a peak has been tentatively identified. Then it is determined whether the SIG is smaller than PEAK less the large hysteresis LHYST <74> (corresponding to a threshold T2). IF so, the peak has been verified and the output is set to 0, VALLEY is set to SIG, and the FLAG is set to TRUE <76> and the program returns to block 66 to begin a search for a valley. If block 74 is not true, it is queried whether SIG is less than PEAK less the small hysteresis SHYST <78> (corresponding to a threshold T1). If so, and the FLAG is TRUE <80>, the peak has been verified and the output is set to 0, VALLEY is set equal to SIG, and FLAG is set to FALSE <82>. If either block 78 or 80 is false, it is next decided whether SIG is greater than VALLEY plus LHYST <84> and if so FLAG is set to TRUE <86>; this indicates that after the previous valley the signal has increased to the second threshold T2 defined by the large hysteresis, and thus the peak can be verified at threshold T1 by blocks 78 and 80. After either blocks 76, 82, 84 or 86 the state machine returns to block 66 to get the next SIG value and, if the output state is still 1 the logic is repeated or, if the output state is 0, similar logic is processed to search for and verify a valley.

Figure 6:
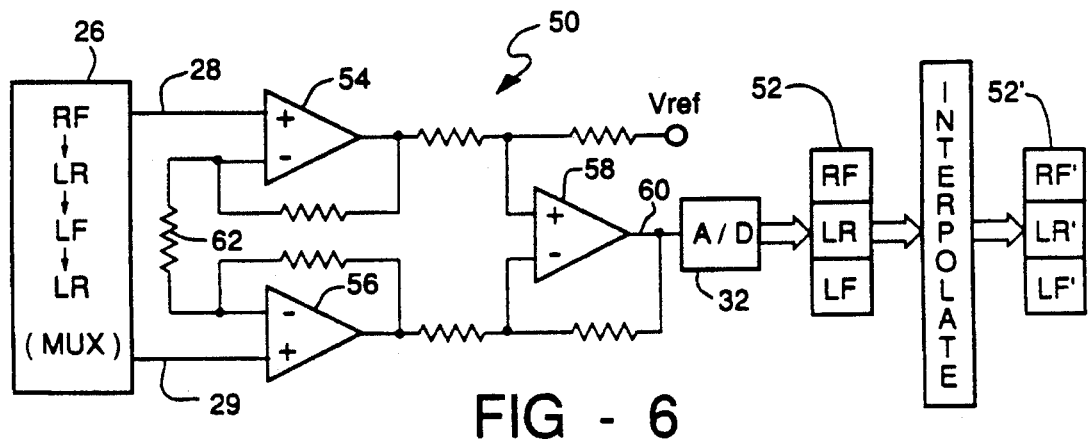
FIG. 6 is a schematic diagram of a signal amplifier showing the order of signal processing according to another embodiment of the invention.

For rear wheel drive vehicles having a single rear sensor driven at twice the frequency of front wheel sensors, the MUX 26, as shown in FIG. 6, couples the rear sensor (LR) to the amplifier 50 after each front sensor so that the multiplexing sequence is RF, LR, LF, LR etc. This causes the rear sensor signal to be sampled at twice the rate of the front sensor sampling. Since the rear frequency can be twice the front frequency, the sample rate per cycle will be the same for all three signals. The digitized signals are stored in three registers 52 for use by the state machine 40. Interpolated values will be derived for the front sensors. The state machine, in turn, multiplexes the signals in the same manner as the MUX 26; i.e., the rear sensor signal is processed after each front sensor signal to properly utilize the faster update rate of the rear signal register. Thus the same circuitry accommodates both front and rear wheel drive vehicles with only software adjustment, mainly affecting multiplexing.

It will thus be seen that by reason of a dual hysteresis method of detecting signal peaks and valleys, square waves are reliably generated from nonuniform cyclical signals including signals with single cycle anomalies. It is also shown herein that the method for multiplexing analog signals and for squaring digitized signals is readily adaptable to various sensor arrangements, even for systems having sensors of different operating frequencies at the same wheel speed.

While the present invention has been described in reference to the illustrated embodiment, it will be understood that the scope of the invention is limited only by the appended claims.

The embodiments of the invention in which an exclusive property or privilege is claimed are defined as follows:

1. A method of synthesizing a square wave from a cyclical signal subject to noise and to varying peak and valley amplitudes comprising the steps of:

establishing a large and a small hysteresis value;

producing a digital signal from the cyclical signal;

identifying peaks and valleys of successive half cycles in the digital signal;

setting first reference levels at a small hysteresis value above each valley and below each peak;

setting second reference levels at a large hysteresis value above each valley and below each peak; and generating a digital square wave transition for each half cycle by:

selecting the first reference level when and only when, for the previous half cycle, the signal crossed the second reference level, otherwise selecting the second reference level; and in the current half cycle, generating a transition after the signal passes a peak or valley and then passes the selected reference level, whereby noise is rejected due the large hysteresis value, and single cycle anomalies caused by a low half cycle amplitude are accepted as valid due to the small hysteresis value.

2. The invention as defined in claim 1 wherein the small hysteresis value is on the order of one half the large hysteresis value.

3. The invention as defined in claim 1 wherein the step of producing a digital signal comprises;

periodically sampling the signal and digitizing each sample, whereby the digitized samples are quantized according to the sampling frequency; and inserting an interpolated value between each pair of adjacent samples to reduce the quantization.

4. The invention as defined in claim 1 wherein the stop of identifying peaks and valleys comprises the steps of:

sampling consecutive digital signal values; and finding peaks and valleys by comparing consecutive samples to locate local maxima and minima.

5. A method of synthesizing a square wave from a cyclical digital signal subject to varying peak and valley amplitudes comprising the steps of:

establishing first and second hysteresis values, the second value being larger than the first value;

identifying peaks and valleys of successive half cycles in the signal;

selecting the first hysteresis value for the ensuring half cycle when the signal passes a peak or valley by a given amount and otherwise selecting the second hysteresis value; and generating a square wave transition each time the signal passes a peak or valley by the selected hysteresis amount.

6. The invention as defined in claim 5 wherein in the selecting step the given amount is greater than the first hysteresis value.

7. The invention as defined in claim 6 wherein in the selecting step given amount is the second hysteresis value.

\* \* \* \* \*